United States Patent [19]

Tate

[11] 3,920,929

[45] Nov. 18, 1975

[54] KEY TELEPHONE SYSTEM

[75] Inventor: Louis David Tate, Norcross, Ga.

[73] Assignee: Bell Telephone Laboratories, Incorporated, Murray Hill, N.J.

[22] Filed: Mar. 29, 1974

[21] Appl. No.: 456,390

[52] U.S. Cl. ............. 179/99; 179/84 A; 179/18 FA

[51] Int. Cl.²............................................ H04M 1/00

[58] Field of Search........ 179/99, 81 R, 84 A, 18 F, 179/18 FA

[56] References Cited

UNITED STATES PATENTS

| | | | |
|---|---|---|---|
| 3,420,963 | 1/1969 | Abbot et al. | 179/99 |
| 3,484,754 | 12/1969 | Sivda | 179/18 FA |
| 3,604,857 | 9/1971 | Opferman | 179/99 |
| 3,715,516 | 2/1973 | Ebrahimi | 179/18 FA |
| 3,716,674 | 2/1973 | Mands | 179/18 FA |
| 3,789,147 | 1/1974 | Saito et al. | 179/18 FA |

*Primary Examiner*—Kathleen H. Claffy
*Assistant Examiner*—Gerald L. Brigance
*Attorney, Agent, or Firm*—H. L. Newman

[57] ABSTRACT

A key telephone system is disclosed that includes a clock for generating both flash and wink lamp signals and digital timing signals. The system also includes a plurality of line control circuits, each of which is associated with an individual telephone line and a plurality of key telephone sets, each of which is associated with one or more telephone lines. Thus the key telephone system includes a plurality of subsystems, each comprising a telephone line and the line circuit and elements of the key telephone sets associated with that telephone line. Each line circuit includes an electronic ringing detector and hold bridge circuit and a magnetic line current sensor. In addition, each line circuit includes several counters, and each counter is activatable to a plurality of states, one of which corresponds to a particular operational mode of the subsystem. A first group of logic gates responds to the occurrence of conditions associated with a particular operational mode (i.e., presence of loop current and absence of A lead current associated with hold mode) by applying the digital timing signals of the clock to one of the counters and/or enabling the counter to be advanced in response to such signals toward the state corresponding to that particular mode. A second group of logic gates respond to the counter reaching that corresponding state, indicating the continuous existence of the associated conditions for a predetermined period of time, by placing the subsystem in the particular mode (i.e., applying the hold bridge to the line and wink lamp signals to the sets).

20 Claims, 7 Drawing Figures

KEY TELEPHONE SYSTEM

This invention relates to the field of key telephone systems and within that field to an arrangement which lends itself to use in a small business environment.

BACKGROUND OF THE INVENTION

Most subscribers served by multiple telephone lines find that the basic features that key telephone systems generally provide are quite desirable. These features consist of (1) visual signaling for indicating which of the lines is being rung, is in use, or on hold; (2) selective pickup for enabling the use of any of the lines from a single set; and (3) selective application of a hold bridge for allowing a subscriber busy on one line to hold the connection to that line and place or receive a call on another line. It is clear that these features greatly facilitate efficient use of multiple telephone lines, and this has resulted in widespread use of key telephone systems.

However, many small business subscribers whose needs are satisfied by four telephone lines or less serving 20 stations or less find that the key telephone systems presently available cost more than they wish to spend and/or require more space than they are able or willing to give up. The problem to be solved therefore is the design of a key telephone system for such a small business environment that is less expensive than existing equipment and occupies a small amount of space.

My solution to this problem relies upon the use of electronic digital circuitry. The 60 Hertz power required to operate key telephone systems provides the basic timing function needed for such circuitry. In addition, such circuitry lends itself to integration which provides economies of both space and cost.

The use of digital circuitry in a key telephone system is disclosed in U.S. Pat. No. 3,604,857 issued to D. C. Opfermann, on Sept. 14, 1971. However, in that key telephone system, in addition to a line circuit or module being associated with each telephone line, a station module is associated with each station set, interconnection therebetween being accomplished by crosspoint modules. Furthermore, each station set must transmit and receive digital data signals and therefore special purpose rather that standard station sets must be used.

Finally, in that key telephone system, clock pulses are used to establish time slots, each of which is assigned a particular bit of information. The bits of information are transmitted in a particular sequence between each line module and the associated station modules and between each station module and its associated station set. In addition each line module is enabled in a particular sequence.

Each line module includes a 9 state counter and when a particular line module is enabled in its turn, the counter thereof is always stepped through all 9 states. The first 5 states serve to transmit information bits to the associated station modules, 4 of the 5 states causing enabling pulses to be applied to individual transmit logic gates that provide unique outputs dependent upon information bits received from the associated station modules during the previous advancement of the counter. The sixth state causes an enabling pulse to be applied to the associated crosspoint modules, while the last 3 states serve to receive information bits from the associated station modules, these 3 states causing enabling pulses to be applied to individual receive logic gates that provide unique outputs dependent upon information bits concurrently received from the associated station modules. The receive logic gates serve to set or reset memory flip-flops that provide inputs to the transmit logic gates during the next advancement of the counter.

SUMMARY OF THE INVENTION

A key telephone system in accordance with the present invention is of far greater simplicity. No station modules or crosspoint modules are required, and standard key telephone sets may be used. Furthermore, rather than continuously scanning the components of the system to determine whether conditions have changed, the system responds only when a change in conditions occurs and remains essentially quiescent during other times.

The key telephone system disclosed herein includes a clock for generating both flash and wink lamp signals and digital timing signals. The system also includes a plurality of line control circuits, each of which is associated with an individual telephone line and a plurality of key telephone sets, each of which is associated with one or more telephone lines. Thus the key telephone system includes a plurality of subsystems, each comprising a telephone line and the line circuit and elements of the key telephone sets associated with that telephone line. Each line circuit includes an electronic ring detector and hold bridge circuit and a magnetic line current sensor. In addition, each line circuit includes several counters. Each counter is activatable to a plurality of states, one of which corresponds to a particular operational mode (i.e., idle, hold) of the subsystem.

A first group of logic gates responds to the occurrence of conditions associated with a particular operational mode (i.e., presence of line current and absence of A lead current associated with hold mode) by applying the digital timing signals of the clock to one of the counters and/or enabling the counter to be advanced in response to such signals toward the state corresponding to that particular mode. A second group of logic gates responds to the counter reaching that corresponding state, indicating the continuous existence of the associated conditions for a predetermined period of time, by placing the subsystem in the particular mode (i.e., apply wink lamp signals to the sets at the same time that the hold bridge is applied to the associated telephone line).

DETAILED DESCRIPTION OF THE INVENTION

Figure 1:
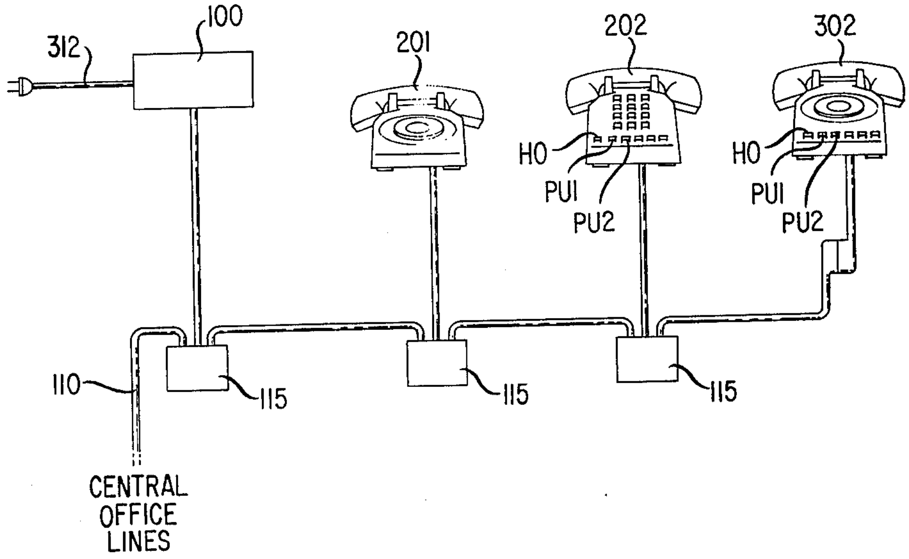
FIG. 1 is a sketch showing the components of a key telephone system in accordance with the invention.

In the description that follows, the first digit of the reference number of each component refers to the drawing figure number where that component is shown.

Referring to FIG. 1, a key telephone system for a small business environment in accordance with the present invention includes a plurality of standard telephone sets, such as found in existing key telephone systems. The telephone may be either key telephones or single line sets. Furthermore, since no dial register is required in the key telephone system of this invention, the telephone may be a mixture of rotary and pushbutton dial sets. Three sets are shown, a rotary dial single line set 201, a pushbutton dial key set 202, and a rotary dial key set 302.

With the use of such standard telephone sets, the circuitry of the key telephone system is housed within a controller unit 100. Alternatively, the circuitry could be housed within one or more special purpose sets. A multiconductor cable 110 connects a plurality of central office telephone lines to the controller unit 100 and connects the circuitry of the controller unit to each of the telephone sets. Bridging adapters 115 are advantageously used to interconnect the controller unit 100 with each of the sets.

All of the telephones are wired identically, that is, the corresponding button in each key set has the same function or telephone line associated therewith. Thus, the first button in each key set is the hold button HO, the second button in each set is the pickup button PU1 for line 1, the third button in each set is the pickup button PU2 for line 2, and so on. As a result, the interconnecting cable 110 is the same everywhere in the system, eliminating the need for a cross connect field, and the cable may be either connector ended or cut down depending upon the need of the installation.

Figures 3, 6:
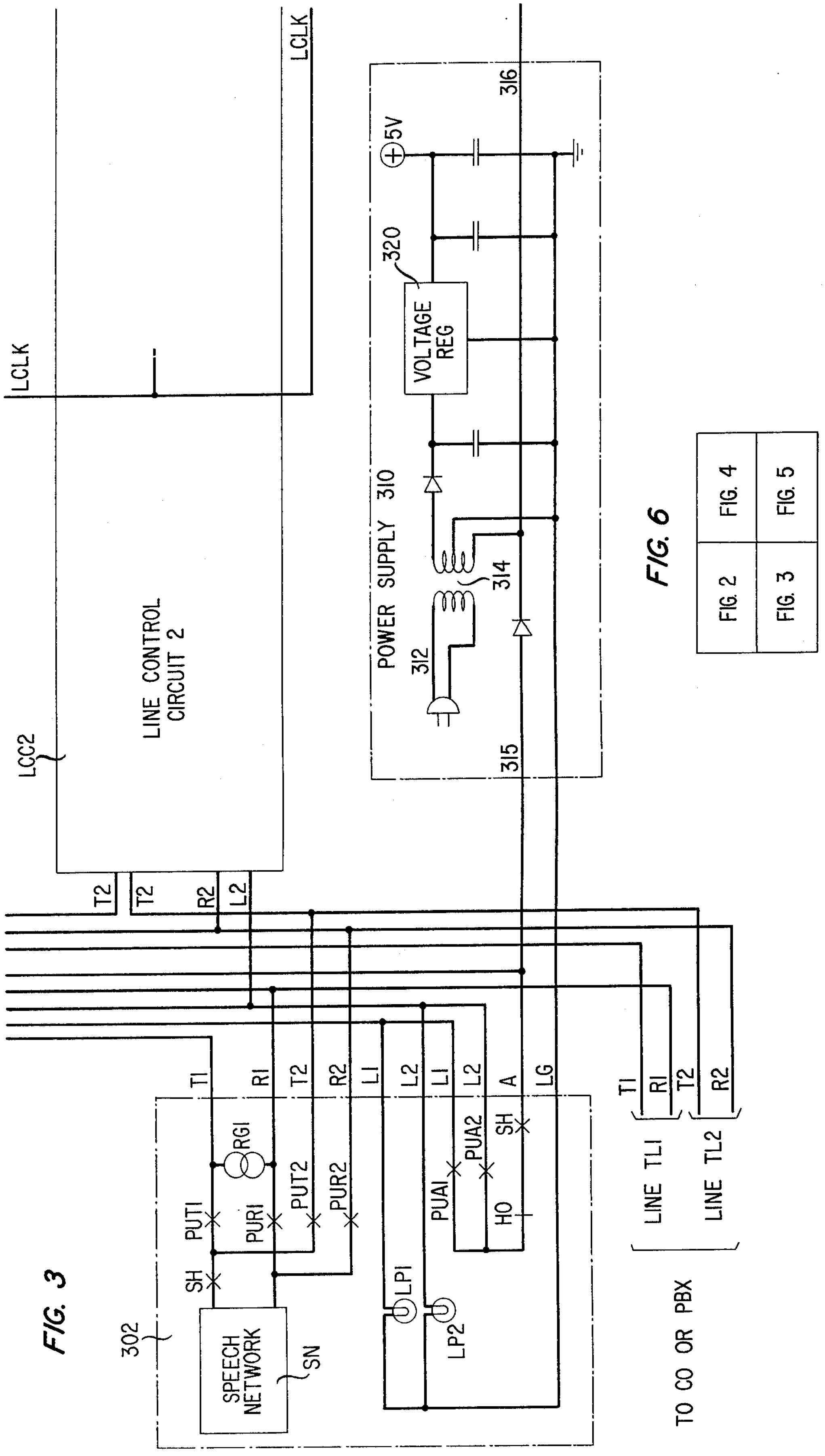
FIG. 6 is a block diagram showing the arrangement of FIGS. 2 through 5.
Figure 4:
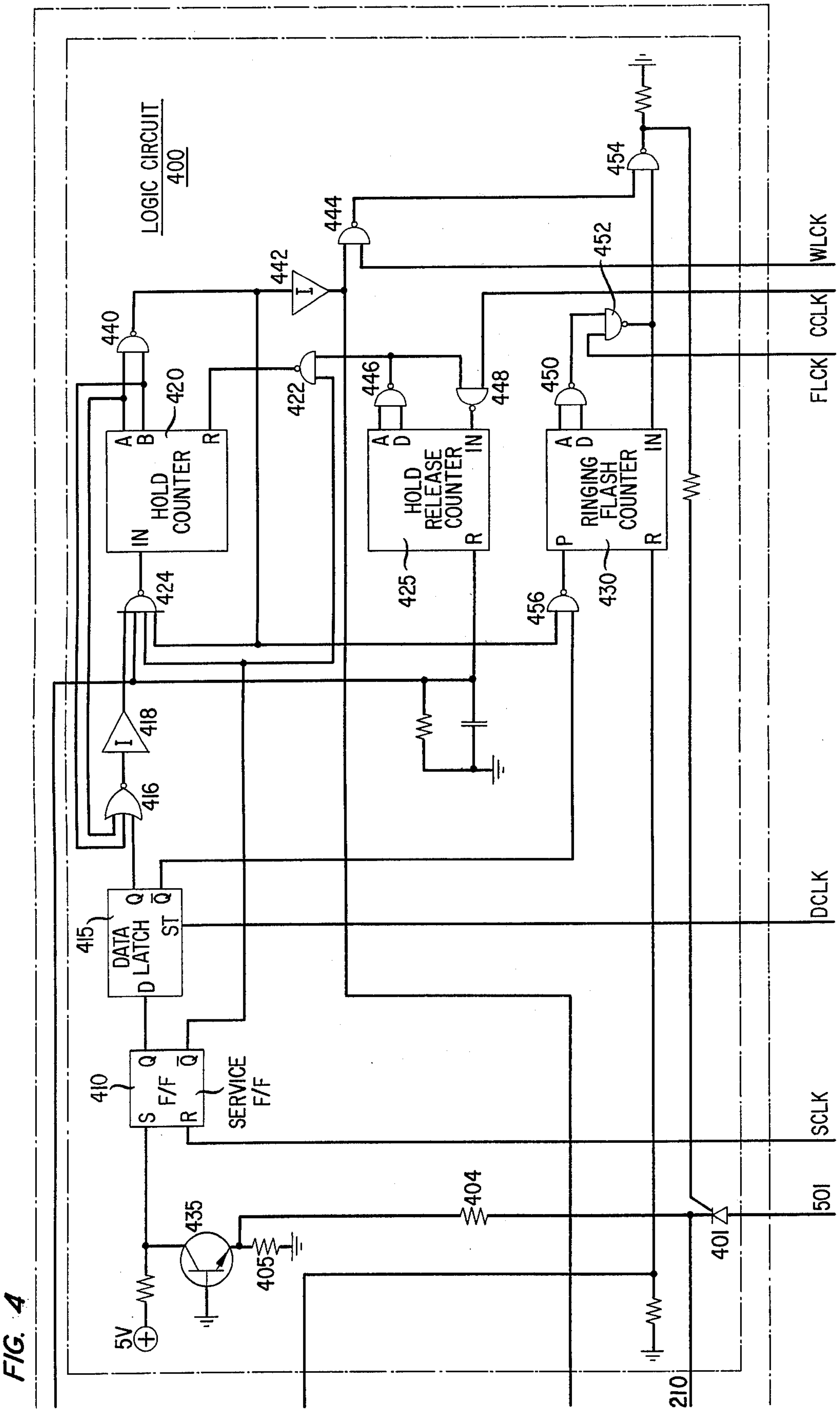
Figure 5:
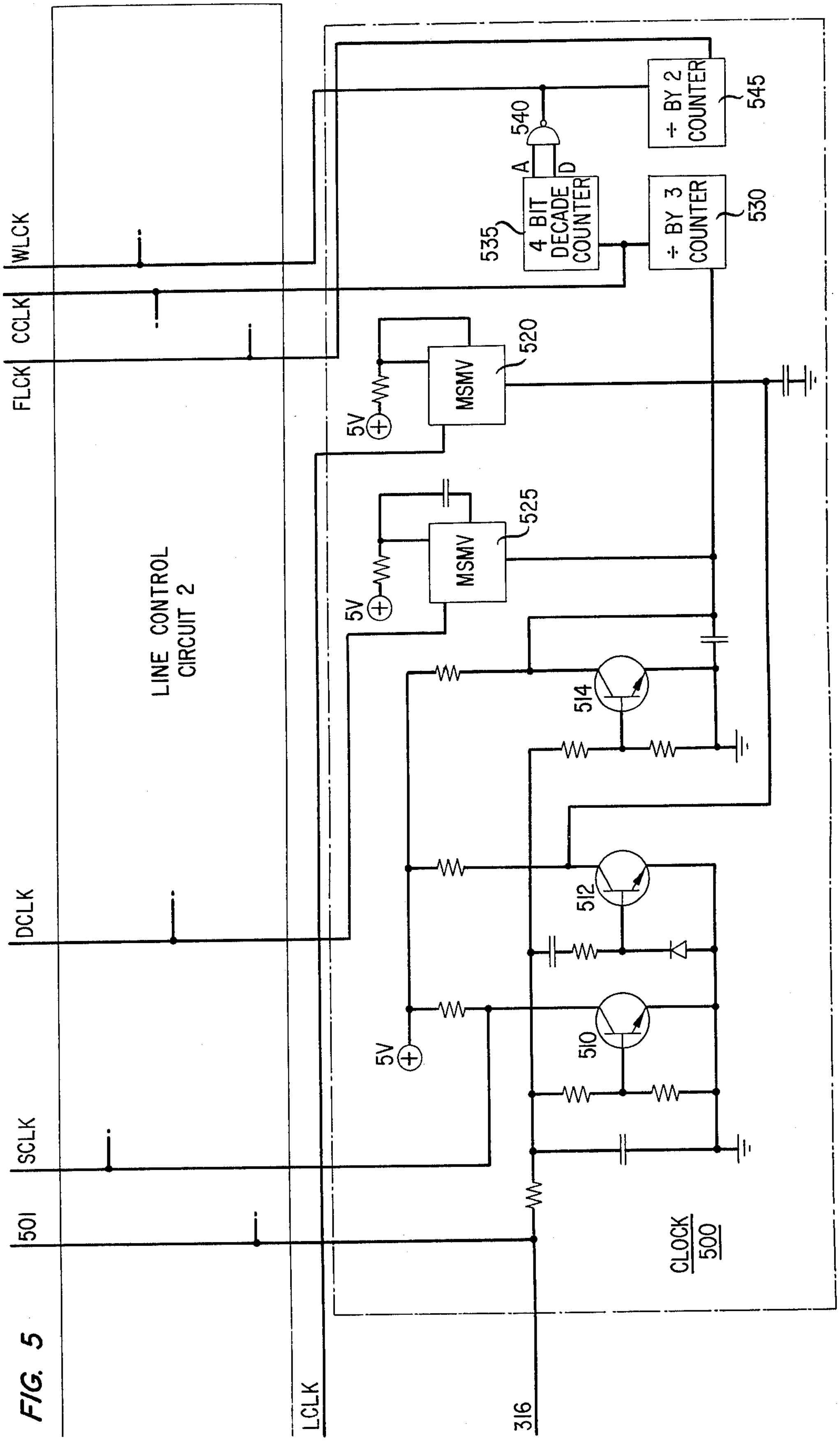

Referring now to FIGS. 2, 3, 4, and 5, which are arranged in accordance with FIG. 6, the key telephone system shown services two telephone lines TL1 and TL2 and the three telephone sets 201, 202, and 302 and includes a pair of line control circuits LCC1 and LCC2. The telephone line TL1 is associated with the line control circuit LCC1 and elements of the telephone sets 201, 202 and 302, and this combination comprises a subsystem of the key telephone system. Similarly, the telephone line TL2 is associated with the line control circuit LCC2 and elements of the telephone set 202 and 302, and this combination comprises another subsystem of the key telephone system. Both subsystems have a plurality of operational modes, i.e., idle, ringing, inuse, and hold, and each subsystem can be in a different operational mode.

The line control circuits LCC1 and LCC2 are identical and therefore only one line control circuit, in this case LCC1, need be described in detail. The major components of the line control circuit LCC1 comprise a hold bridge circuit 220, a line current sensor 240, a ringing detector 260, and a logic circuit 400, the logic circuit including a service flip-flop 410, a data latch 415, a hold counter 420, a hold release counter 425, and a ringing flash counter 430. The details of these components will be described with respect to the operation of the associated subsystem.

In addition to the foregoing the key telephone system includes a power supply 310 and a clock 500. The power supply 310 is connected to a standard 110 volt, 60 cycle source, such as by a plug ended power cord 312, and includes a transformer 314 from which is derived 13 volt ac for illuminating the lamps of the key sets. Negative half cycle ac is applied to the lamps via conductor 315 connected to what is commonly referred to as the A lead and what is herein referred to as the signal lead A of each set, while positive half cycle ac is applied to the lamps via conductors 316, 501, and a silicon controlled rectifier in each line circuit which is connected to the associated lamp lead L of each key set. The output of the transformer 314 is also rectified and applied to a voltage regulator 320 to provide well regulated 5 volt dc power needed for the operation of both the clock 500 and the line control circuits.

The clock 500 relies upon the 60 cycle ac commercial power frequency as a timing reference from which all system clocking information is derived. The clock 500 includes transistors 510, 512, and 514 which respectively provide three squared-off and phase-shifted signals derived directly from the secondary of the transformer 314 of the power supply 310. The output of transistor 510 provides a service clock signal SCLK, shown in FIG. 7, that is applied to the service flip-flop in each line control circuit. The output of transistor 512 provides a 270° phase-shifted signal input to a monostable multivibrator 520, which in turn provides a line clock signal LCLK, shown in FIG. 7, that is applied to the line current sensor in each line control circuit. The output of transistor 514 provides a 180° phase-shifted signal input to both a monostable multivibrator 525 and a divide by 3 counter 530. The monostable multivibrator 525 provides a data clock signal DCLK, shown in FIG. 7, that is applied to the data latch in each line control circuit, while the divide by 3 counter 530 provides a 20 Hertz counter clock signal CCLK, shown in FIG. 7, used as one of the gate inputs to advance the hold release counter in each line control circuit.

The 20 Hertz output of the divide by 3 counter 530 also serves as an input to a 4 bit decade counter 535, and the A and D outputs of the counter are connected to a NAND gate 540 that provides a 2 Hertz wink clock signal WCLK having the proper timing (450 msec at 1 and 50 msec at 0) to control the lamp wink rate in accordance with generally accepted standards. Finally, the 2 Hertz output of the gate 540 is also applied to a divide by 2 counter 545, the output of which provides a 1 Hertz flash clock signal FCLK having the proper timing (500 msec at 1 and 500 msec at 0) to control the lamp flash rate in accordance with generally accepted standards.

With this background we shall now describe the operation of the subsystem including line control circuit LCC1 in each of the various operational modes of the subsystem, that is, idle, ringing, in-use, and hold. When reference is made to the input leads of gates, the numbering is from top to bottom or from left to right as the case may be.

IDLE MODE

When the subsystem is in the idle operational mode, the telephone set 210 is on hook, and the telephone sets 202 and 302 are either on hook or the line pickup buttons PU1 thereof are unoperated whereby the contacts of PU1 are open. Therefore the negative half cycle ac applied by the power supply 310 to the signal leads A of the sets is not connected either to the lamps LP1 of the sets 202 and 302 or to the emitter of transistor 435 of line control circuit LCC1. As a result of the former, the lamps LP1 are not illuminated. As a result of the latter, transistor 435 is turned off, whereby its collector rides high. This place a 1 on input lead S of the service flip-flop 410, and since the flip-flop is held in the reset condition, the service clock signal SCLK, shown in FIG. 7, applied to input lead R of the flip-flop has no effect at this time.

The output Q of the service flip-flop 410 places a 0 on the input lead D of the data latch 415. Because the output Q of the data latch 415 is determined by the signal on the input lead D at the time a pulse is applied to the strobe input lead ST, the strobe pulse in this case being the data clock signal DCLK shown in FIG. 7, the output Q in the idle mode is 0. The output $\overline{Q}$ of the data latch 415 is the inverse of Q.

In addition, for reasons that will become clear as the description proceeds, when the subsystem is in the idle mode, the hold counter 420, which is a 2 bit binary counter, is at 0, 1, or 2 count. Therefore, a 0 is applied to either one or both output leads A and B of the hold counter 420. A NAND detector gate 440 connected to the A and B output leads consequently applies a 1 to an inverter 442, which in turn applies a 0 to the first input lead of a NAND wink gate 444. The wink gate 444 is thereby disabled, and the wink clock signal WCLK applied to the second input lead of the wink gate does not pass through the gate.

The hold release counter 425, which is a 4 bit decade counter, is at a 9 count, and therefore a 1 is applied to both output leads A and D thereof. A NAND detector gate 446 connected to the A and D output leads thereby applies a 0 to the first input lead of a NAND counter input gate 448. As a result, the counter input gate 448 is disabled and the counter clock signal CCLK applied to the second input of the gate does not advance the counter.

Furthermore, the ringing flash counter 430, which is also a 4 bit decade counter, is also at a 9 count. The 1 appearing at output leads A and D thereof is applied to a NAND detector gate 450 which in turn applies a 0 to the second input lead of a NAND flash gate 452. Thus, the flash gate 452 is disabled and the flash clock signal FCLK applied to the first input lead of the gate does not pass through the gate.

It is seen that the outputs of the wink gate 444 and the flash gate 452, which are both at 1 in the idle mode, serve as the inputs to a NAND lamp driver gate 454, the output of which is connected to the gate lead of lamp control SCR 401. The SCR 401 is turned on by a 1 output from the lamp driver gate 454 to apply positive half cycle ac to the lamps LP1 of the telephone sets 202 and 302, and since the output of the lamp driver gate in the idle mode is 0, the lamps are not illuminated in accordance with either the flash clock signal FCLK or wink clock signal WCLK.

Finally, in the idle mode the line clock signal LCLK does not pass through the line current sensor 240. As indicated by the schematic drawing of the line current sensor 240, it comprises a closed magnetic core 242 having three parallel legs. Sense windings 244 and 245, to which the line clock signal LCLK is connected, are disposed about the outer legs. In addition, the sense windings 244 and 245 have the same number of turns, are connected in series with one another, and are poled oppositely to one another. Control winding 246, which is connected in series with the tip conductor of the telephone line, is disposed about the center leg of the magnetic core 242. The number of turns in each of the windings and the dimensions of the magnetic core are selected so that line clock signals LCLK applied to the sense windings 244 and 245 when no line current is flowing through the control winding 246 results in no signals being induced in the control winding and no signals being passed through the sense windings. This is because the structure provides a high inductance that essentially extinguishes the signals. When, however, line current of either polarity is present, the flux generated by the control winding 246 saturates the magnetic core, significantly reducing the inductance of the structure, and line clock signals LCLK pass through the sense windings 244 and 245.

RINGING MODE

When ringing voltage is applied to the telephone line TL1, it appears across the ringers RG1 of each of the telephone sets 201, 202 and 302. Thus all three sets are rung. In addition, the ringing voltage is applied to capacitor 262 and primary winding 264 of transformer 265 of the ringing detector 260. A voltage is thereby induced in secondary winding 266 of the transformer 265 that is rectified and filtered, and after several cycles of 20 Hertz ringing, transistor 268 is turned on.

The turning on of transistor 268 applies a 1 to reset input lead R of the ringing flash counter 430 and the counter is reset to 0 count, whereby a 0 is applied to both output leads A and D of the counter. The detector gate 450 consequently applies a 1 to the second input lead of the flash gate 452, and the gate is enabled to apply the flash clock signal FCLK (500 msec at 1 and 500 msec at 0) to the second input lead of the lamp driver gate 454. Since the first input lead of the lamp driver gate 454 has a 1 applied thereto by the wink gate 444, the lamp driver gate applies the flash clock signal FCLK to the lamp control SCR 401. The lamp control SCR 401 is turned on and off in accordance with the flash clock signal FCLK, and when turned on it applies positive half cycle ac to the lamps LP1 of telephone sets 202 and 302 via the conductor 210 and lamp lead L1. The lamps LP1 consequently flash on and off to provide a visual signal for indicating ringing on telephone line TL1 and the subsystem is placed in the ringing mode.

Anytime the ringing signal is removed from the telephone line TL1, which occurs either to provide the silent interval between ringing signals or because the calling party has hung up, the transistor 268 of the ringing detector 260 turns off. A 0 is then applied to the reset lead R of the ringing flash counter 430, and the counter is no longer held in a reset condition. It is seen that the flash gate 452, in addition to applying the flash clock signal FCLK to the lamp driver gate 454, also applies this signal to input lead IN of the ringing flash counter 430. Thus when the reset signal is removed, the flash clock signal FCLK commences to advance the ringing flash counter 430 at a 1 Hertz rate.

Inasmuch as the ringing flash counter 430 is a 4 bit decade counter, one or the other of the output leads A and D is a 0 through the count of 8. Thus throughout that count, the output of the detector gate 450 remains a 1 and the flash gate 452 is enabled to respond to the flash clock signal FCLK. Since the silent interval between each ringing signal is typically only 4 seconds in duration, the approximately 9 seconds required to advance the ringing flash counter 430 beyond the count of 8 provides more than enough time to span the silent intervals between ringing signals.

If the ringing signal has stopped to provide the silent interval between ringing signals, then when the next ringing signal occurs, the transistor 268 of the ringing detector 260 is again turned on, and ringing flash counter 430 is again reset to 0. Thus the counter begins counting from 0 at the beginning of each silent interval.

If, on the other hand, the ringing signal has stopped because the calling party has hung up, then the ringing flash counter 430 will advance until it reaches the count of 9. At this count a 1 is applied to both output leads A and D, causing the detector gate 450 to apply a 0 to the second input lead of the flash gate 452. The flash gate 452 is thereby disabled, terminating both the flashing of the lamps LP1 of the telephone sets 202 and 302, and the pulsing of the input lead IN of the ringing flash counter 430. The ringing flash counter 430 remains at the count of 9 and the subsystem is returned to the idle mode.

IN-USE MODE

When the telephone set 201 goes off hook or when either telephone set 202 or 302 goes off hook with the pickup button PU1 operated, the telephone line TL1 is seized. Assuming, for example, that telephone set 302 has gone off hook with its pickup botton PU1 operated, whereby switch hook contacts SH and pickup contacts PUT1, PUR1, and PUA1 are all closed, a path is provided from the central office or local PBX on tip lead T1 into the line control circuit LCC1, through control winding 246 of the line current sensor 240, back out from the line control circuit to the telephone set 302, through closed pickup contacts PUT1 and closed switch hook contacts SH to the speech network SN of the telephone set, and back out from the telephone set through closed pickup contacts PUR1 to the ring lead R1 to return to the central office or local PBX. Thus the speech network SN of the telephone set 302 is connected across the telephone line TL1.

As described above, the presence of line current on the control winding 246 of the line current sensor 240 permits the line clock signals LCLK to pass through the sensor. This signal is applied to the reset input R of the hold release counter 425. Thus when the telephone line TL1 is seized, the hold release counter 425 is reset to the 0 count, whereby a 0 is applied to both output leads A and D thereof. As a result, the detector gate 446 applies a 1 to the second input lead of NAND reset gate 422 and the first input lead of counter input gate 448. The reset gate 422 is thereby enabled to respond to the output $\overline{Q}$ of the service flip-flop 410 while the counter input gate 448 is enabled to respond to the cóunter clock signal CCLK.

At the same time, a path is completed from the power supply 310 which applies negative half cycle ac through conductor 315, the signal lead A, the closed switch hook contacts SH, the closed hold contacts HO, and the closed pickup contacts PUA1 to lamp lead L1. From the lamp lead L1 the negative half cycle ac power extends to lamp LP1 and lamp ground LG in both the telephone sets 202 and 302 whereby the lamps LP1 in both sets are provided steady illumination to indicate that the telephone line TL1 is in use.

Figure 7:
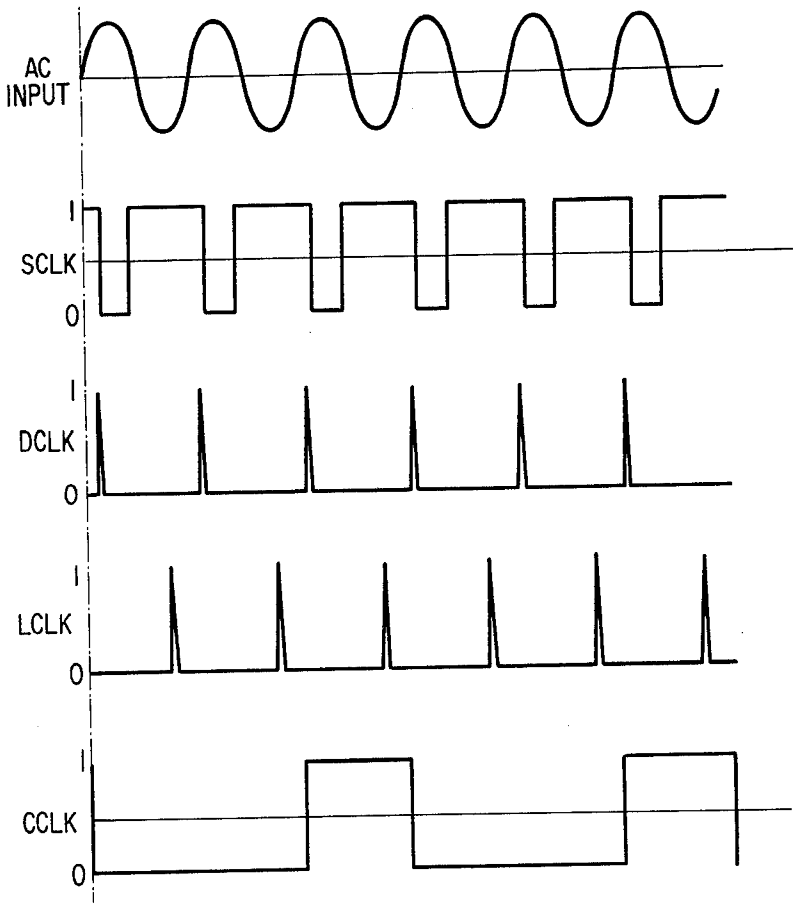
FIG. 7 is a timing plot of signals generated by the clock of the key telephone system.
Figure 2:
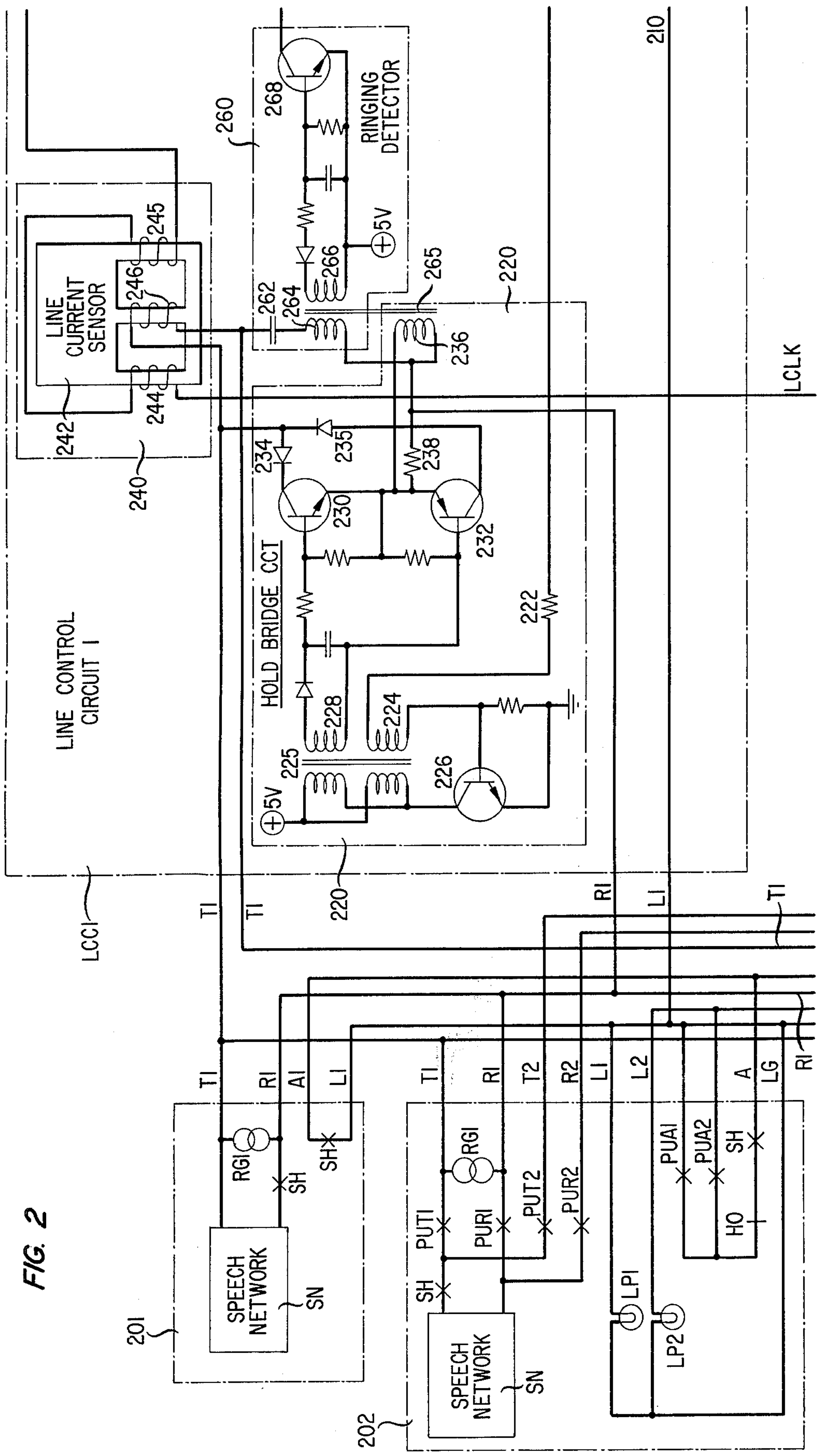
FIGS. 2 through 5 present a schematic circuit diagram of the key telephone system.

In addition, the negative half cycle ac power from the lamp lead L1 extends to the line control circuit LCC1 wherein a path is provided to ground via conductor 210 and resistors 404 and 405. The presence of negative half cycle ac at the emitter of the transistor 435 causes it to turn on during each negative half cycle. Each time it turns on, it applies a 0 to the input lead S of the service flip-flop 410, and since as shown in FIG. 7, the service clock signal SCLK applies a 1 to input lead R during each negative half cycle, the flip-flop is placed in a set condition during this phase of each cycle. In the set condition, the output Q goes to 1 and the output $\overline{Q}$ goes to 0. Then during each positive half cycle when the transistor 435 turns off, a 1 is again applied to the input lead S and the service clock signal SCLK applies a 0 to the input lead R to reset the service flip-flop 410, whereby the output Q goes to 0 and the output $\overline{Q}$ goes to 1.

The output Q of the service flip-flop 410 is applied to input lead D of the data latch 415. Because as shown in FIG. 7, the data latch 415 is strobed by the data clock signal DCLK prior to the service clock signal SCLK applying a 0 to the reset input lead R of the service flip-flop 430, a 1 is applied to output Q of the data latch the first time the flip-flop is set and this output remains at a 1 as long as the flip-flop continues to be periodically set by the negative half cycle ac power on the signal lead A.

The 0 provided on output lead $\overline{Q}$ of the data latch 415 is applied to the second input lead of NAND preset gate 456 whereby a 1 is applied to the preset input P of the ringing flash counter 430. This causes the counter to be preset to and/or held at the 9 count. Thus if the subsystem had been in the ringing mode when telephone line TL1 was picked up, the presetting of the ringing flash counter 430 to the 9 count would immediately disable the flash gate 452 and thereby terminate the application of positive half cycle ac at the flashing rate to the lamps LP1 of the telephone sets 202 and 302.

The first time that the service flip-flop 410 is set, the 0 on the $\overline{Q}$ output is applied to the first input lead of the reset gate 422 whereby a 1 is applied to the reset input lead R of the hold counter 420. This causes the counter to be reset to and/or held at the 0 count. Thus if the subsystem had been in the hold mode when the telephone line TL1 was picked up, the resetting of the hold counter 420 to the 0 count would immediately disable the wink gate 444 and thereby terminate the application of positive half cycle ac at the winking rate to the lamps LP1 of the telephone sets.

With the hold counter 420 at the 0 count, the A and B output leads thereof both have a 0 applied thereto. It is seen that the A and B output leads, in addition to being connected to the detector gate 440, are respectively connected to the first and second input leads of NOR detector gate 416, the third input lead of which is connected to the Q output of the data latch 415. Thus with negative half cycle ac present on the signal lead A whereby the output Q of the data latch 415 is at 1, the output of the detector gate 416 is a 0. This is changed to a 1 by inverter 418 and applied to the first input lead of NAND counter input gate 424. The fourth input lead of the counter input gate 424 is connected to the output of the detector gate 440 and with the hold counter 420 in the 0 count this output is a 1. The third input lead of the counter input gate 242 is connected to the output Q of the servce flip-flop 410, while the second input lead is connected to the sense windings 244 and 245 of the line current sensor 240.

HOLD MODE

To place the telephone line TL1 on hold, the hold button HO (FIG. 1) is operated whereby the hold contacts HO (FIG. 3) are opened. The negative half cycle ac on the signal lead A and the lamp lead L1 is thereby interrupted, turning the lamps LP1 and the transistor 435 off. The next 0 input of the service clock signal SCLK to the input R of the service flip-flop 410 resets the flip-flop and it remains in the reset condition as long as transistor 435 stays off. The output Q of the service flip-flop 410 goes to a 0 while the output $\overline{Q}$ goes to a 1. Since as shown in FIG. 7, the data clock signal DCLK strobe pulse applied to the data latch 415 precedes the resetting pulse of the service clock signal SCLK, the data latch output momentarily remains the same.

Consequently, the 1 on the $\overline{Q}$ output of the service flip-flop 410 applied to the third input lead of the counter input gate 424 in addition to the 1 already present on the first and fourth input leads thereof enables the gate to respond to the 60 Hertz line clock signal LCLK which, because line current is still present, is passed through the line current sensor 240 and applied to the second input lead of the gate. As shown in FIG. 7, the pulse of the line clock signal LCLK is in between the resetting pulse of the service clock signal SCLK and the strobe pulse of the data clock signal DCLk. Therefore, the first line clock pulse LCLK occurring after the service flip-flop 410 has been reset applies a 0 to input lead IN of the hold counter 420 and advances the counter to the first count. At this count, a 1 is applied to output A and a 0 is applied to output B. Thus output of detector gate 440 remains a 1 while the output of detector gate 416 remains a 0. Furthermore, when the first pulse of the data clock signal DCLK following the resetting of the service flip-flop occurs, whereby the output Q of the data latch 415 goes to 0, the detector gate 416 still provides a 0 output.

On the third pulse of the line clock signal LCLK, which occurs between 36 and 52 msec after the hold contacts HO are opened, the counter is advanced to the third count wherein a 1 is applied to both output leads A and B thereof. The output of the detector gate 440 thereupon goes to 0 thereby disabling the counter input gate 424 and leaving the hold counter 420 in the third count. In addition, the 0 output of the detector gate 440 is changed to a 1 by the inverter 442 to enable the wink gate 444 to apply the wink clock signal WCLK (450 msec at 1 and 50 msec at 0) to the first input lead of the lamp driver gate 454. Since the second input lead of the lamp driver gate 454 has a 1 applied thereto by the flash gate 452, the lamp driver gate applies the wink clock signal WCLK to the lamp control SCR 401. The lamp control SCR 401 is thereby turned on and off in accordance with the wink clock signal WCLK, and when turned on it applies positive half cycle ac to the lamps LP1 of the telephone sets 202 and 302 via the conductor 210 and the lamp lead L1. The lamps LP1 consequently wink on and off to provide a visual signal for indicating that the telephone line TL1 is on hold.

The output from the inverter gate 442 is also applied through a resistor 222 and a winding 224 of a transformer 225 to the base of a transistor 226 of the hold bridge circuit 220. The transformer 225 and transistor 226 form a simple oscillator that is turned on by the 1 output from the inverter gate 442. A voltage is thereby induced in winding 228 of the transformer 225 that is rectified and filtered and used to bias on transistors 230 and 232. The transistors 230 and 232 are of the high voltage type so as to withstand dial pulsing and high voltage transients on the telephone line. In addition the transistors 230 and 232 are arranged with blocking diodes 234 and 235 so that a bridging path is provided across the telephone line TL1 regardless of the polarity of the line current. Furthermore the bridging path includes a winding 236 on the ringing transformer 265 shunted by a resistor 238. This combination provides a hold bridge path having approximately the same ac and dc impedance as the speech network of a telephone set.

Thus it is seen that when the hold counter 420 advances to the count of 3, a winking signal is applied to the line lamp LP1 of the telephone sets 202 and 302 and a hold bridge is applied across the telephone line TL1. The hold button HO of the telephone set 302 is thereafter released whereby the hold contacts HO reclose and the pickup button PU1 is mechanically released to open pickup contacts PUT1, PUR1, and PUA1. The open pickup contacts PUT1 and PUR1 remove the speech network SN of the telephone set 302 from across the telephone line TL1 while the open pickup contacts PUA1 continue to disconnect negative half cycle ac from the lamp lead L1. Consequently, the line lamp LP1 is only illuminated responsive to the wink clock signal WCLK. The subsystem is thereby placed in the hold mode.

It should be noted that it is possible to advance the hold counter 420 1 or 2 counts following going on hook from the in-use mode if a large number of ringers are bridged on the telephone line TL1. The current flow while the capacitors of the ringers are being charged is interpreted by the line current sensor 240 as the continued presence of line current. For this reason line current must persist long enough to advance the hold counter 420 to the third count in order to place the subsystem in the hold mode, and this is a greater length of time than will result from ringer capacitor charging following the going on hook.

Should the party on hold abandon the call, modern central offices drop the connection to the line whereby line current is terminated. However, interruption of line current of 300 msec or less occurs in some central offices during the normal processing of telephone calls. Thus it is necessary to distinguish between central office cutoff of an abandoned call and normal processing.

When line current on the telephone line TL1 is interrupted, current flow through the control winding 246 of the line current sensor 240 is terminated. As a result, the line clock signal LCLK is no longer passed through the sense windings 244 and 245 and pulsing of the input lead R of the hold release counter 425 ceases. Since the hold release counter 425 is no longer being reset to a 0 count by the line clock signal LCLK, it now advances responsive to the 20 Hertz counter clock signal CCLK applied to the second input lead of the counter input gate 448.

Inasmuch as the hold release counter 425 is a 4 bit decade counter, one or the other of the output leads A and D is a 0 through the count of 8. Consequently, until the hold release counter 425 reaches the count of 9, which at a 20 Hertz pulsing rate requires approximately 450 msec, the output of the detector gate 446 remains at 1, and the counter input gate 448 remains enabled to respond to the counter clock signal CCLK. Should the interruption of the line current be due to something other than central office cutoff, line current will be reestablished before 450 msec have expired. As soon as line current is again present on the control winding 246 of the line current sensor 240, the line clock signal LCLK is passed through the sense windings 244 and 245 to the reset input lead R of the hold release counter 425 and the counter is reset to the 0 count.

If on the other hand, central office cutoff has occurred, then the hold release counter will advance to the count of 9, whereupon a 1 is applied to both output leads A and D thereof. The output of the detector gate 446 then goes to 0, disabling the counter input 448 and leaving the hold release counter at a count of 9. In addition, the 0 output of the detector gate 446 is applied to the second input lead of reset gate 442 whereby the reset gate applies a 1 to the reset input lead R of the hold counter 420 to reset the counter to the 0 count. The output of the detector gate 440 thereupon goes to 1 which is changed to a 0 by the inverter 442. This 0 output of the inverter 442 terminates the operation of the oscillator comprising the transistor 225 and transformer 226 of the hold bridge circuit 220 and thereby removes the hold bridge from across the telephone line TL1. Furthermore, the 0 output of the inverter 442 disables the wink gate 444 whereby winking of the lamps LP1 of the telephone sets 202 and 302 is terminated and the subsystem is returned to the idle mode.

Although a specific embodiment of the invention has been shown and described, it will be understood that it is but illustrataive and that various modifications may be made therein without departing from the scope and spirit of this invention as defined in the appended claims.

What is claimed is:

1. A telephone line control circuit for use in a telephone system comprising a telephone line, the line control circuit, and at least one telephone set associated with the telephone line, the system having a plurality of operational modes, the line circuit comprising:

counter means activatable to a plurality of states, one of which corresponds to particular operational mode of the system;

means responsive to the occurrence of a condition associated with the particular operational mode for activating the counter means to advance toward the corresponding state; and means responsive to the advancement of the counter means to the corresponding state for placing the system in the particular mode.

2. A control circuit as in claim 1 wherein the condition responsive means advances the counter means to the corresponding state only in response to the continuous existence of the associated condition for a predetermined period of time.

3. A control circuit as in claim 1 wherein the condition responsive means includes means responsive to the cessation of ringing voltage on the associated telephone line for advancing the counter means.

4. A control circuit as in claim 3 wherein the ringing cessation means comprises means for detecting ringing voltage on the associated telephone line, the ringing detector means providing a first logic signal when ringing voltage is present and a second logic signal when ringing voltage is absent, and logic means that activates the counter means upon the termination of the first logic signal and the initiation of the second logic signal.

5. A control circuit as in claim 4 wherein the counter means is set at zero count responsive to the first logic signal of the ringing detector means and the counter activating logic means is permitted to advance the counter means upon the termination of the first logic signal and the initiation of the second logic signal.

6. A control circuit as in claim 1 wherein the telephone set includes a ringer and a signal lamp and the system has operational modes of idle, ringing, in-use, and hold, the ringing mode being characterized by flashing of the signal lamp and periodic operation of the ringer responsive to the periodic application of ringing voltage to the associated telephone line, and the counter means is advanced to a state corresponding to the idle mode responsive to the cessation of ringing voltage for a continuous period of time exceeding the time period of the silent intervals between each application of ringing voltage.

7. A control circuit as in claim 6 wherein the counter responsive means includes idle mode logic means responsive to the counter means advancing to said corresponding state for terminating the flashing of the signal lamp.

8. A control circuit as in claim 7 wherein the idle mode logic means comprises a first logic gate that has a unique output only in response to the counter means advancing to said corresponding state, the unique output serving to disable a second logic gate having as one of its inputs a clock signal that provides the timing of the flashing of the signal lamp.

9. A control circuit as in claim 1 wherein the system has operational modes of idle, ringing, in-use, and hold and the set includes a signal lead, a speech network, and switch hook contacts for connecting the speech network to the associated telephone line, current being present on both the signal lead and the associated telephone line when the system is in the in-use mode, and the signal lead being interrupted when the system is to be placed in the hold mode, and wherein the condition responsive means includes means responsive to the presence of line current on the associated telephone line and the cessation of signal lead current when the system is in the in-use mode for advancing the counter means.

10. A control circuit as in claim 9 wherein the counter means is advanced to a state corresponding to the hold mode responsive to the presence of line current and absence of signal lead current for a continuous period of time exceeding the maximum time period that line current continues after the speech network is disconnected from the associated telephone line by the opening of the switch hook contacts while the system is in the in-use mode.

11. A control circuit as in claim 10 wherein the counter responsive means includes hold mode logic means responsive to the counter means advancing to said corresponding state for applying a hold bridge to the associated telephone line that shunts the speech network of the set.

12. A control circuit as in claim 11 wherein the telephone set further includes a signal lamp and the hold mode logic means initiates winking of the signal lamp responsive to the counter means advancing to said selected state.

13. A control circuit as in claim 12 wherein the hold mode logic means comprises a first logic gate having a unique output responsive to the counter means advancing to said corresponding state, the unique output serving to apply the hold bridge and enable a second logic gate having as one of its inputs a clock signal that provides the timing of the winking of the signal lamp.

14. A control circuit as in claim 1 wherein the system has operational modes of idle, ringing, in-use, and hold and wherein the condition responsive means includes means responsive to the cessation of line current on the associated telephone line while the system is in the hold mode for advancing the counter means.

15. A control circuit as in claim 14 wherein the line current cessation means comprises means for detecting line current on the associated telephone line, the line current detecting means providing a first logic signal when line current is present and a second logic signal when line current is absent, and logic means that activates the counter means responsive to the absence of the first logic signal and the presence of the second logic signal.

16. A control circuit as in claim 15 wherein the counter means is set at zero count responsive to the first logic signal of the line current detecting means and the counter activating logic means is permitted to advance the counter means responsive to the absence of the first logic signal and the presence of the second logic signal.

17. A control circuit as in claim 1 wherein the telephone set includes a speech network and a signal lamp and the system has operational modes of idle, ringing, in-use, and hold, the hold mode being characterized by winking of the signal lamp and the presence of a bridging path across the associated telephone line that shunts the speech network of the telephone set, and wherein the counter means is advanced to a state corresponding to the idle mode responsive to the termination of line current on the associataed telephone line for a predetermined period of time while the set is in the hold mode.

18. A control circuit as in claim 17 wherein the counter responsive means includes idle mode logic means responsive to the counter means advancing to said corresponding state for terminating the winking of the signal lamp and removing the bridging path from across the associated telephone line.

19. A line circuit for a telephone system which includes a telephone line formed by a pair of line conductors interconnecting a central office with a telephone set, the telephone set having means for completing a path between the line conductors to permit line current to flow, the circuit comprising:

a magnetic structure having three magnetic flux paths connected in parallel with one another;

a control winding disposed about the middle magnetic flux path of the magnetic structure, the control winding being dimensioned so that the flux generated thereby when current the magnitude of the line current flows therethrough saturates the magnetic structure;

means for connecting the control winding in series with one of the line conductors whereby line current flows through the control winding when the line current is present on the line conductors;

a sense winding disposed about each of the outer flux paths of the magnetic structure, the sense windings both having approximately the same number of turns and being poled oppositely to and connected in series with one another;

means for connecting the input of the sense windings to a signal source; and means connected to the output of the sense winding for responding to the signal of the signal source.

20. In a line circuit for a telephone system which includes a telephone line formed by a pair of line conductors interconnecting a central office with a telephone set, a circuit for applying a bridge path across the line conductors in parallel with the telephone set when the telephone line is placed on hold, the circuit comprising:

a transformer having a first and second winding magnetically coupled to one another;

an oscillator including the first winding of the transformer, the oscillator when turned on generating an ac voltage that is coupled to the second winding of the transformer;

means for rectifying the voltage induced in the second winding of the transformer;

a transistor having its base connected to the output of the rectifying means and its emitter-collector path connected in series with an impedance, the transistor being turned on responsive to dc voltage provided by the rectifying means; and means for connecting the emitter-collector impedance path across the line conductors of the telephone line whereby when the oscillator is turned on, the transistor is turned on and the impedance is connected across the line conductors of the telephone line.

* * * * *

UNITED STATES PATENT AND TRADEMARK OFFICE

CERTIFICATE OF CORRECTION

PATENT NO. : 3,920,929

DATED : November 18, 1975

INVENTOR(S) : Louis D. Tate

It is certified that error appears in the above-identified patent and that said Letters Patent are hereby corrected as shown below:

Column 3, line 2 after "The" change "telephone" to --telephones--. Column 3, line 5, change "telephone" to --telephones--. Column 3, line 44, change "inuse" to --in-use--. Column 4, line 66, change "place" to --places--. Column 7, line 22, change "botton" to --button--. Column 8, lines 60 and 61, change "Q" to --$\bar{Q}$--.Column 8, line 59, change "242" to --424--. Column 9, line 24, change "DCLk" to --DCLK--. Column 11, line 27, change "illustrataive" to --illustrative--. Column 14, line 24, change "bridge" to --bridging--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*